Patented Dec. 1, 1931

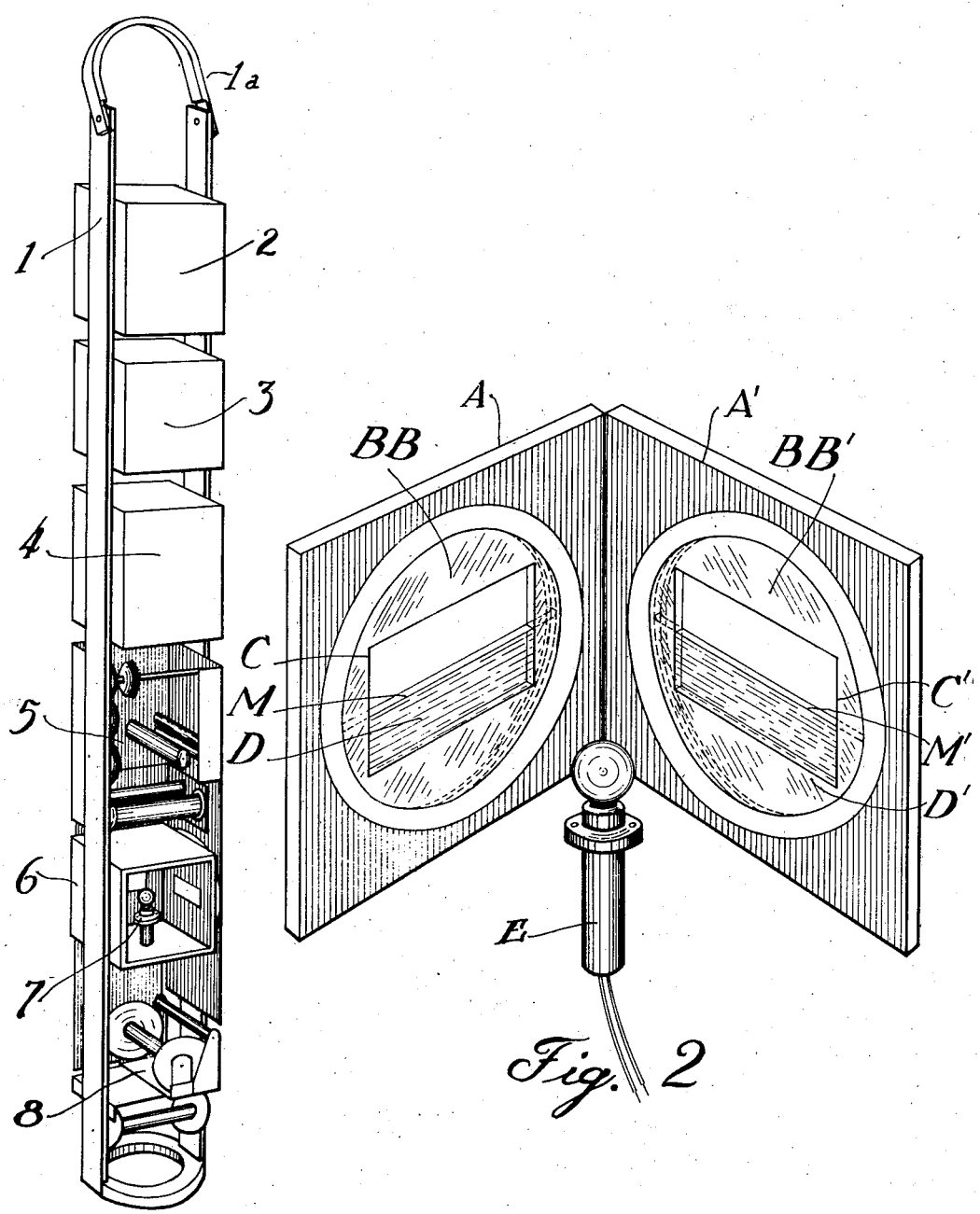

1,833,889

UNITED STATES PATENT OFFICE

DAVE PIERCE CARLTON AND KENNETH HARTLEY, OF HOUSTON, TEXAS, ASSIGNORS TO STANDARD OIL DEVELOPMENT COMPANY, A CORPORATION OF DELAWARE

BORE-HOLE CLINOMETER

Application filed August 23, 1929. Serial No. 387,855.

The invention relates to improvements in the art of obtaining data in bore-holes and resides in an improved method of determining the amount of inclination of the bore-hole as well as its direction.

The main purpose of the instrument is to provide a simple and rapid means of determining the angle of inclination of a borehole at one or more points. Automatic control of the device is so arranged that a series of observations can be made without drawing the instrument from the bore-hole. By orienting the drill stem before the observation is made at each point and combining with the angle of inclination at each point it is possible to make a complete bore-hole survey.

With the above mentioned and other objects in mind, the invention consists in the novel construction and parts hereinafter described, illustrated in the accompanying drawings, and set forth in the claims hereto appended, it being understood that various changes in the form, proportion, size and minor details of construction within the scope of the claims may be made without departing from the spirit or sacrificing any of the advantages of the invention.

The use of liquid level indicators (meniscus clinometers) instead of any form of pendulum eliminates all moving mechanical parts and all friction from the clinometer proper, thus measuring very small angles accurately, and at the same time provides effective damping which brings the liquid to rest immediately and prevents blurring of the record.

The instrument in use is fitted into a suitable water tight container of proper size to be used in bore-holes and of sufficient strength to withstand high fluid pressures as might be found in lowering the device to 6000 or 8000 feet into bore-holes.

The container for the device is fitted for the proper connections for attaching it to drill pipe, tubing, cable or any other thing with which it may be lowered into the borehole.

In the accompanying drawings Fig. 1 is a perspective, partly sectional view, showing one arrangement of the mechanism, and Fig. 2 is a perspective view of a preferred form of the meniscus clinometer, on an enlarged scale with respect to Fig. 1.

Referring to the drawings, reference numeral 1 indicates the frame of the instrument. A bail or other suitable means 1a is secured to the upper end of the frame for convenience in handling. The casing in which the instrument is mounted is not illustrated as it may be of any conventional type. For example, a fluid-tight steel cylinder having means for attachment to a cable, string of tubing, or the like.

Mounted in the frame are a program clock 2, batteries 3, and motor 4, connected to the batteries. Rollers 5 and 8, actuated by the motor, are provided to expose photographic film or paper to the light from lamp 7. The lamp as shown is mounted so as to illuminate liquid level devices BB and BB' having polygonal side walls. These devices are mounted in a frame which may be of any suitable form, such as rectangular or triangular. We prefer to use a meniscus clinometer in the form of parallel glass plates separated by a spacing ring so as to form a flat fluid-tight chamber. D, D' indicate the body of liquid in the chamber formed by the glass plates. Any suitable liquid may be used in the chambers, such as mercury, oil, alcohol, xylene, or the like. The level of the liquid is indicated by M, M'. It may have a free surface, or may carry a float. Mats C, C' are provided to "frame" each exposure.

It will be understood that any suitable source of illumination may be used. In general an electric lamp of the type shown is most desirable, or a spark-gap or the like may be used.

In the enlarged view shown in Fig. 2, the character E indicates generally any suitable source of illumination and A any suitable mounting for the meniscus clinometer. If a complete record is to be obtained at least two of the clinometers must be used, but the present invention is not limited to any particular number.

In the operation of the instrument it is lowered into the bore-hole to be surveyed, the clock 2 having been set to operate the light 7 at the desired intervals of time, for example, one or two minutes, and to expose a portion of the photographic film. The image of the liquid body in the meniscus clinometer is registered on the film. The exposure gives two simultaneous records of the meniscus in the two chambers. The program device connected with the cloth then trips an electromagnet which starts motor 4, which in turn reels a new section of photographic paper in front of the apertures in the meniscus chambers, thus making the instrument ready for the next exposure.

The train of mechanism, including the program clock, batteries, reels for photographic film, and source of illumination, form no part of the present invention and need not be further described.

It will be understood that the device is lowered to the desired depth in the well, the photographic impressions being obtained as it descends. The time interval between these impressions may be varied by adjustment of the program clock. From the data obtained it is possible to map accurately the direction of the bore-hole, a reference line having been previously established at the surface of the earth. Our device is particularly useful in connection with drilling wells for the production of petroleum, but it may be applied for any other desired purpose.

We claim:

1. The method of measuring the angle of departure from the vertical of a bore-hole at a series of points, which comprises lowering into the bore-hole a device comprising a plurality of chambers partly filled with liquid, and arranged at an angle to each other, and obtaining a photographic record of the position of the liquid level in such chambers.

2. A recording clinometer comprising a liquid level indicating device having polygonal side walls, means for illuminating said device, and means for simultaneously obtaining a photographic record of the position of the liquid level along at least two angularly disposed sidewalls.

3. A recording clinometer comprising two flat glass chambers containing liquid, said chambers being arranged at an angle to each other, a source of illumination placed within the angle formed by the chambers, and means for obtaining a photographic record of the position of the liquid in the chambers.

4. A recording clinometer which comprises the combination of at least one chamber containing liquid and having transparent side walls, a source of illumination, movable strips of photographic paper externally of the chamber to receive the image of the liquid surface, and suitable mechanism for controlling the illumination.

5. A recording clinometer comprising a liquid level indicating device having polygonal side walls transparent at the normal level of liquid in the device, means for illuminating the device, and means externally of the side walls for simultaneously obtaining a photographic record of the position of the liquid level along at least two angularly disposed sidewalls.

DAVE PIERCE CARLTON.
KENNETH HARTLEY.